United States Patent [19]

Harben

[11] Patent Number: 5,682,015

[45] Date of Patent: Oct. 28, 1997

[54] SQUIRREL SHIELD DEVICE

[75] Inventor: Michael Harben, Acworth, Ga.

[73] Assignee: Georgia Power Company, Atlanta, Ga.

[21] Appl. No.: 631,837

[22] Filed: Feb. 6, 1996

Related U.S. Application Data

[63] Continuation of Ser. No. 138,035, Oct. 15, 1993, abandoned.

[51] Int. Cl.⁶ .................................................. H01B 17/00
[52] U.S. Cl. ..................... 174/5 R; 174/138 R; 174/139; 52/101
[58] Field of Search ......................... 174/138 R, 139, 174/140 R, 5 R, 144, 140 CR, 209; 119/174, 57.9; 114/221 R; 52/101

[56] References Cited

U.S. PATENT DOCUMENTS

| 1,766,636 | 6/1930 | Hölzel | 174/139 |
|---|---|---|---|
| 2,234,391 | 3/1941 | Taylor | 324/6.66 |
| 2,617,378 | 11/1952 | Osol | 114/221 |
| 2,999,479 | 9/1961 | Carder | 174/139 X |
| 3,005,436 | 10/1961 | Caldwell | 114/221 |
| 3,016,034 | 1/1962 | Raistakka | 114/221 |
| 3,056,376 | 10/1962 | Bender | 116/23 |
| 4,053,707 | 10/1977 | Ely et al. | 174/209 |
| 4,201,883 | 5/1980 | Shepherd | 174/139 |
| 4,243,628 | 1/1981 | Herold | 264/275 |
| 4,467,387 | 8/1984 | Bergh et al. | 174/139 X |
| 4,731,507 | 3/1988 | Torimoto et al. | 174/139 |
| 5,023,406 | 6/1991 | Thornley | 174/209 |
| 5,293,835 | 3/1994 | Shagoury | 119/57.9 |

FOREIGN PATENT DOCUMENTS

| 4050129 | 1/1993 | Japan | 174/144 |
|---|---|---|---|

OTHER PUBLICATIONS

Fargo Product Literature, Oct., 1990, pp. 11–12.
Guthrie Guard Product Literature, 1989, pp. 1–6.
Raychem Product Literature Catalog, Jul., 1993, pp. 1–20.
Salisbury Wildlife Protection Product Literature, Apr., 1990.
IEEE Guide for Animal Deterrents for Electric Power Supply Stations. Published May 26, 1993.
Michael Harben, "Stopping Squirrel Outages in Substations", Feb., 1993, Power Delivery, vol. 6, No. 2.

*Primary Examiner*—Hyung S. Sough
*Assistant Examiner*—Paramita Ghosh
*Attorney, Agent, or Firm*—Troutman Sanders LLP

[57] ABSTRACT

The invention relates to a shield which prevents squirrels or other animals from causing faults in power distribution substations. Switch and bus insulators are primary points of contact when a small animal crawls from a grounded, supporting structure across an insulator to an energized conductor. The present invention provides for a barrier on switch and bus insulators which prevents animals from coming into contact with a grounded structure and an energized conductor simultaneously, thus eliminating a ground path from the energized conductor through the animal to the grounded structure.

25 Claims, 6 Drawing Sheets

SQUIRREL SHIELD DEVICE

This is a continuation of application Ser. No. 08/138,035, filed on Oct. 15, 1993, now abandoned.

BACKGROUND OF THE INVENTION

1. Technical Field

This invention relates generally to devices which protect various electrical components from contact with small animals and, more particularly, to a device which prevents a small animal from simultaneously contacting an energized component and a grounded conductive structure within an electrical power distribution substation.

2. Description of the Prior Art

Squirrels or other small animals climbing onto electrical equipment in power distribution substations often ground energized equipment and cause "low-side faults." A low-side fault generally refers to a short circuit to ground on a low voltage bus and/or other electrical equipment connected to a low voltage side of a step-down transformer in a power distribution substation. Low voltage in this context refers to power distribution voltage levels which may be tens of thousands of volts. When a small animal provides a conducting path from an energized substation component to ground via a support structure, extensive damage both to the animal and to electrical equipment may occur. Such an occurrence causes a low-side fault within the substation leading to damage to transformers, insulators, switches, feeder breakers, and other equipment due to high values of electrical fault current, and electrical arcs generated by the short circuit. An explosion or fire may result, along with interruption of electrical power service to power consumers. Repairing the damage from a low-side fault is costly and also requires an extended interruption of service to customers. Thus, small animals such as squirrels that crawl on exposed, energized components can cause extensive damage to unprotected components within the substation and are a nuisance to electric power producers whose ultimate goal is to provide customers with electricity free from interruption.

A number of devices have been used in attempts to prevent small animals from coming into contact with energized substation components and grounded structures. Fake owls have been placed on substation structures with the intention of warding off squirrels or other small animals. Ultrasonic devices and lights have been used as a deterrents to small animals. Finally, trapping devices, animal repellents, and screening have also been used to prevent small animals from approaching power substations. Unfortunately, none of the above-mentioned deterrents have proved to have a significant effect on the number of animal-caused faults in power distribution substations.

Other devices have been placed directly in contact with energized contacts or support structures. Grease lubricants have been applied to support structures to prevent animals from climbing on power substations; however, normal weather conditions have been known to degrade and reduce the lubricating effect of grease. Furthermore, greased structures within a power substation have not presented a favorable work environment for maintenance crews. Heat-shrinkable tape and insulating paint have been used on supporting structures and energized buses to prevent small animals from grounding an energized surface or contact. Unfortunately, heat-shrinkable tape and paint have also been found to degrade from exposure to the weather, and thus have only limited effectiveness. Furthermore, insulating material degrades when in direct contact with an energized surface. This degradation has been termed "insulation breakdown," and has limited the effectiveness of insulating paint, heat-shrink tape, and other cover-up devices in adequately covering energized surfaces. Moreover, small animals climbing on substation equipment often puncture heat-shrinkable tape and insulating paint with their claws or nails. Cover-up devices have been used for breaker bushings, lightening arrestor leads, and station service transformer leads; however, spaces between switch and bus insulators or bus insulators and steel structures remain unprotected. Unfortunately, unprotected portions of energized structures near bus insulators in substations have been the primary points of contact for squirrels and other small animals.

SUMMARY OF THE INVENTION

While fake owls, screens, and animal repellents have been used in an attempt to keep animals out of power distribution substations; and while tapes, paints, and various covering devices have been used to protect breaker bushings and lightening arrestor leads from contact with small animals, no such guard or shield has been developed which would effectively protect switch insulators, bus insulators, and various bushings by preventing an animal from simultaneously making contact with a grounded structure and a high voltage conductor.

The invention generally relates to a shield which prevents squirrels or other animals from causing faults on energized equipment in power distribution substations. Switch and bus insulators are primary points of contact when a small animal crawls from a supporting, grounded structure across the insulator to an energized conductor. Other points of contact include breaker and transformer bushings. The present invention therefore provides for a shield on intermediary devices to prevent animal-caused faults. Generally, an intermediary device is constructed of non-conducting material, mounted on a grounded structure, such as a support structure or some type of grounded housing, and supports a conductive device. Examples of intermediary devices are switch insulators, bus insulators, breaker bushings, transformer lead bushings, and any other type of insulator or bushing. The shield is mounted on an intermediary device and prevents animals from simultaneously contacting a grounded structure and an energized conductor, thus eliminating a ground path from the energized conductor through the animal to the grounded structure. This prevents damage resulting from high fault current flowing though the contact to ground at the point where the small animal immediately contacts the energized equipment.

In several embodiments, a squirrel shield according to the present invention can be constructed from any durable nonconducting material. Preferably, a transparent material such as UV treated Lexan (a registered trademark of General Electric) polycarbonate sheet plastic can be used as a material for fabricating the squirrel shield. The shield is generally formed from two semi-circular or rectangular portions. At least one shield portion has a slit defined by space between two extensions and a central edge. The central edge is adapted to conform to the intermediary device when the shield is assembled. More specifically, the slit is adapted to fit around a diameter of the intermediary device between skirts and over corresponding portions of another shield portion, such that corresponding portions of each shield portion overlap one another. Appropriate fastening means such as bolts, pop rivets, or plastic adhesive hold the overlapping portions together around the intermediary device. The shield extends radially outward and substantially perpendicular to a longitudinal axis of the insulator or bushing. Since these embodiments retrofit a shield to one or several intermediary devices, the shield can be installed when substation equipment is energized. This is not possible with many conductor covering techniques.

In another embodiment, the shield is formed integrally with an intermediary device so as to provide for an intermediary device-shield combination apparatus that is formed of only one piece. This apparatus allows maintenance crews to install only one piece which not only provides support to a conductor or an energized device, but also provides for protection against animal-caused faults.

Small animals crawling from a grounded structure across an insulator or bushing must climb around the shield to arrive at an energized device or conductor. The shield is of sufficient radius or width (measured perpendicular to a longitudinal axis of the insulator or bushing) such that the animal cannot simultaneously contact the grounded structure and energized conductor or device. The animal must climb from the grounded structure over the shield, then from the shield to the energized conductor or vice versa, thereby eliminating the animal as a path to ground. For example, an intermediary device such as an insulator or bushing having a first end coupled to a first conductor (which may be energized) and a second end coupled to a second conductor (which may be grounded), typically separates the conductors and isolates the first conductor from a path to ground in the second conductor. When an average-sized squirrel or a small animal having a predetermined length equal to that of an average-sized squirrel attempts to traverse the intermediary device having a shield according to the present invention mounted thereon, the present invention assures that a sum of a first distance from the intermediary device first end to a peripheral edge of the squirrel shield and a second distance from the squirrel shield peripheral edge to the second end of the intermediary device is greater than the predetermined length of the small animal or average-sized squirrel, thereby preventing it from simultaneously contacting the first and second conductors.

In a first embodiment, a shield according to the present invention includes two shield portions. At least one shield portion includes a main portion substantially semi-circular in shape with a slit defined by space between two extensions extending from the main portion. The portions having slits are adapted to fit around an insulator between skirts, and the assembled shield is substantially circular in shape.

In a second embodiment, a shield according to the present invention includes two shield portions. At least one shield portion includes a main portion substantially rectangular in shape with a slit defined by space between two extensions extending from the main portion. The shield portions having slits are adapted to fit around an insulator, and the assembled shield is substantially rectangular in shape.

In a third embodiment, a shield according to the present invention includes several square shields adapted to fit over insulators which are located close to one another. In this embodiment, peripheral edges of each individual shield overlap with adjacent shields, forming a larger shield over several insulators.

In a fourth embodiment, a shield of two portions according to the present invention is adapted to fit over a group of insulators. In this embodiment, at least one portion of the shield includes a main portion substantially rectangular in shape with at least three extensions extending from the main portion. Slits are located between extensions and always number one less than the number of extensions. The shield portions having slits are adapted to fit around the insulators. The assembled shield is substantially rectangular in shape.

In a fifth embodiment, an apparatus according to the present invention comprises a shield which is integral with an electrical insulator, forming a shielded insulator of unitary construction.

In a sixth embodiment, an apparatus according to the present invention comprises a shield which is integral with a bushing. Such a bushing is used in a power distribution substation to insulate an energized conductor from a grounded housing of a transformer or breaker. The shield prevents a small animal from simultaneously contacting a grounded housing of a breaker or transformer and an energized conductor. Alternatively, a shield of several portions may also be placed over an existing bushing between skirts. At least one shield portion includes a main portion with a slit defined by space between two extensions extending from the main portion. The shield portions having slits are adapted to fit around a bushing, and the assembled shield may be square, rectangular, or circular in shape.

The present invention is inexpensive, easy to install, allows maintenance crews to visually inspect various components of the substation if transparent, and is not prone to insulation break-down since the shield is attached to an insulator or bushing rather than an energized surface. Moderate shield thickness provides for physical strength, a rugged barrier to small animals, and high voltage insulating properties between the conductor and the supporting grounded structure.

Accordingly, it is an object of the present invention to provide a shield which prevents animal-caused faults in the vicinity of any insulator in a power distribution substation.

It is another object of the present invention to provide a shield for use in power distribution substations which prevents animal-caused faults in the vicinity insulating bushings.

It is another object of the present invention to provide a shield on an insulator or bushing for use in power distribution substations which is transparent and allows maintenance crews to visually inspect nearby components when installed.

Still another object of the present invention is to provide a shield which prevents animal-caused faults in power distribution substations which requires no specialized tools for installation.

Still another object of the present invention is to provide a shield which prevents animal-caused faults in power distribution substations that is not prone to insulation break down.

Finally, another object of the invention is to provide for a shield in power distribution substations which is durable and thus performs as an insulating barrier without being affected by temperature, moisture, debris, or excessive sunlight.

These and other objects are accomplished by the present invention which is more particularly set forth in the remainder of the specification.

BRIEF DESCRIPTION OF THE DRAWINGS

The accompanying drawings illustrate the preferred embodiment of the invention, and serve to aid in the explanation of the principles of the invention.

Other objects, features and aspects of the present invention are discussed in greater detail below.

DETAILED DESCRIPTION OF THE INVENTION

Figure 1:
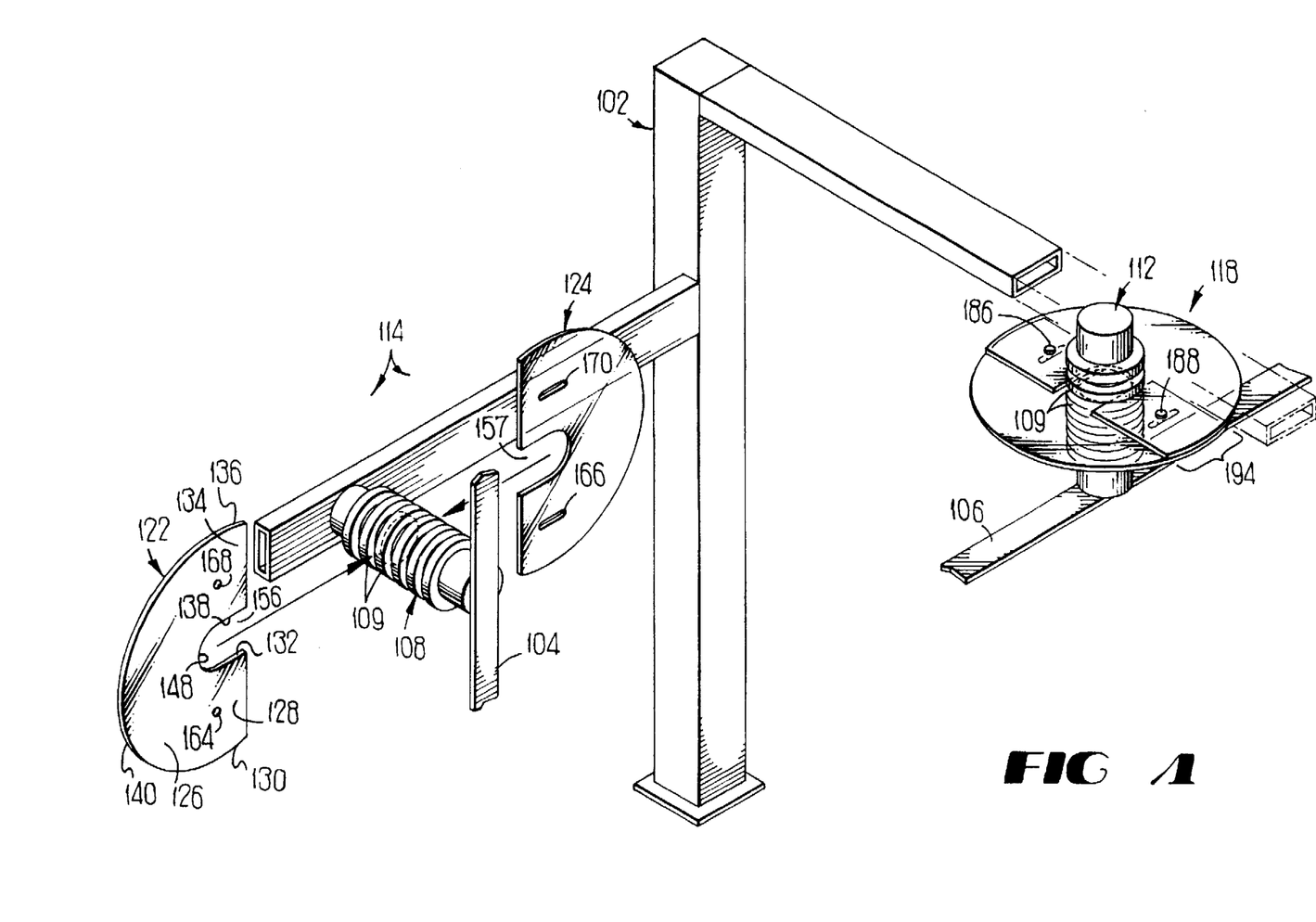
FIG. 1 is a perspective, exploded view of a first embodiment of a shield according to the present invention.

FIG. 1 illustrates a first embodiment of the present invention situated within a portion of a power distribution substation. Grounded supporting structure 102, shown generically, provides support for various conducting devices through insulating components within the power distribution substation. As shown in FIG. 1, ceramic insulators 108 and 112 extend from structure 102 horizontally and vertically, respectively. Insulators 108 and 112 support conducting devices 104 and 106. Conducting devices 104 and 106 may comprise a myriad of components including breakers, buses, switches, bare conducting cable, or any other electrically conducting device. Conducting devices 104 and 106 are normally energized at high voltage levels, making the conductors dangerous to small animals climbing in a power distribution substation.

Shield 114 is exploded in view in order to show relevant details. In this particular embodiment, the shield 114 is comprised of shield portions 122 and 124. Each portion of shield 114 has several additional portions. A main portion 126 of shield portion 122 is substantially semicircular in shape. Extensions 128 and 134 extend from main portion 126. Extension 128 is bordered longitudinally by outer edge 130 and inner edge 132. Similarly, extension 134 is bordered longitudinally by outer edge 136 and inner edge 138. Outer edges 130 and 136 are continuous with peripheral edge 140. Peripheral edge 140 is semicircular and is concentric with central edge 148. Inner edges 132 and 138 and central edge 148 form a slit 156.

Shield portions 122 and 124 are essentially identical except for the location of fastening means. Holes 168 and 164 on shield portion 122 line up with elongated slots 170 and 166 on shield portion 124. This fastening arrangement allows for longitudinal adjustment of the shield portions when placed onto an insulator. Shield 118, identical to shield 114 and shown assembled on insulator 112, illustrates fasteners 186 and 188 placed through the elongated holes and slots at overlapping portion 194. Fasteners 186 and 188 may be of any suitable type including bolts and nuts, screws, and pop rivets.

Slits 156 and 157 of shield portions 122 and 124, respectively, are adapted to be mounted over insulator 108 between skirts 109 as shown more clearly by assembled shield 118. The width of slits 156 and 157 is greater than a diameter of the insulator 108 between skirts 109 but less than an outer diameter of skirts 109. This allows for the shield to be supported between skirts such that extensions from portion 122 match with and overlap extensions from portion 124 between skirts 109. The shield is adapted to be placed between any two skirts on an insulator, but is usually placed between first and second or second and third skirts from the supporting structure while power is on. The shield is mounted on the insulator close to the supporting structure since protection devices, used on conductors 104 and 106 while power is on, allow little or no room for the shield to be placed in the middle portion of the insulator. However, when power is turned off, the shield may be placed between any two skirts.

Figure 2:
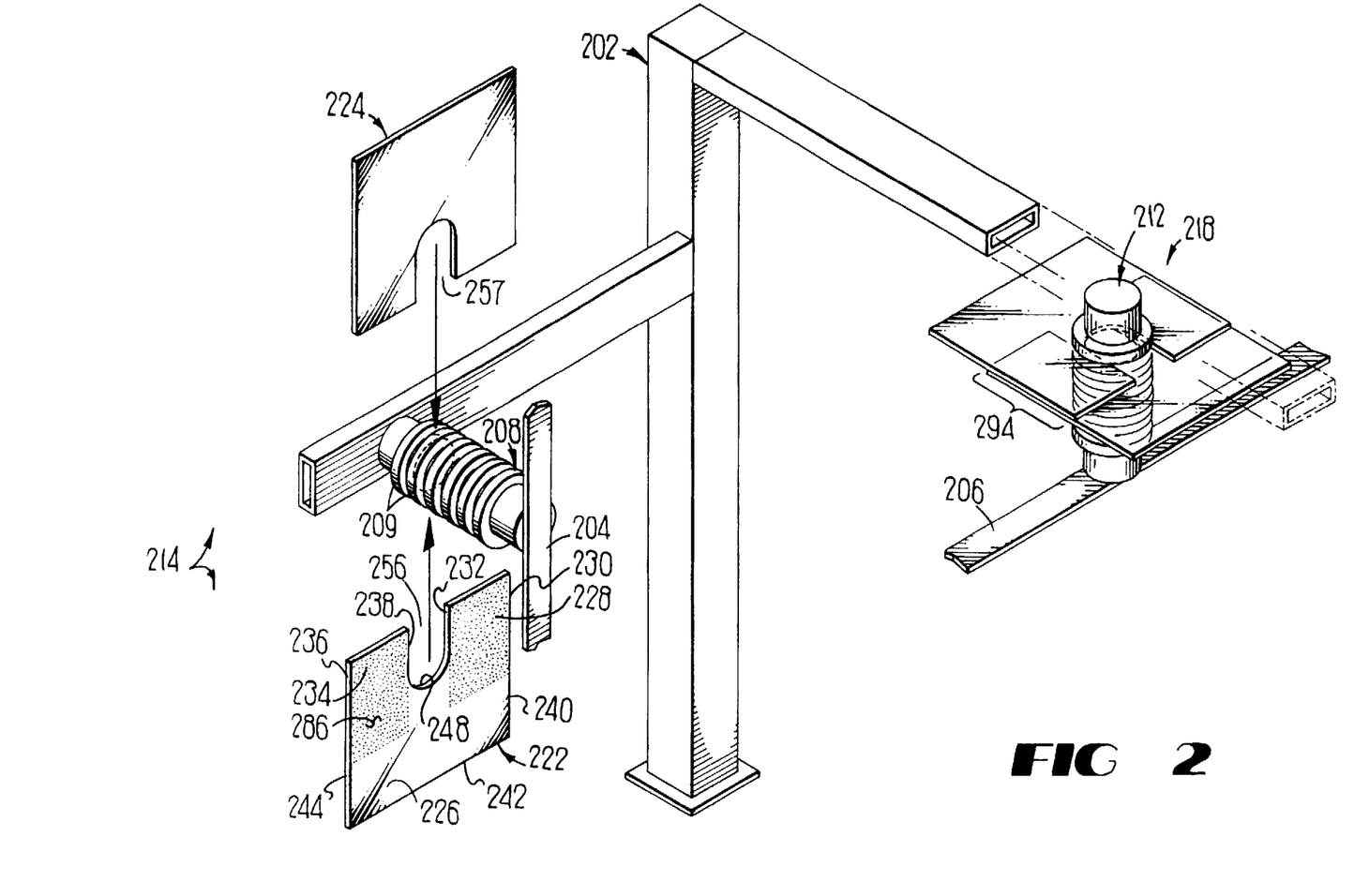
FIG. 2 is a perspective, exploded view of a second embodiment of a shield according to the present invention.

FIG. 2 illustrates a second embodiment of the present invention. Shields 214 and 218 are rectangular in shape after assembly. Shield portions 222 and 224 are similar in shape. Shield portion 222 is comprised of main portion 226 which is rectangular in shape and bordered by peripheral edges 240, 242, and 244. Extensions 228 and 234 extend from main portion 226. Extension 228 is bordered longitudinally by outer and inner edges 230 and 232, respectively. Similarly, extension 234 is bordered by outer and inner edges 236 and 238, respectively. Inner edges 232 and 238 and central edge 248 define slit 256 which is adapted to fit over insulator 208 between skirts 209 in a manner identical to the first embodiment illustrated in FIG. 1. FIG. 2 also illustrates adhesive 286 as fastening means between shield portions 222 and 224. Any appropriate fastening means including screws, bolts and nuts, or pop rivets placed through drilled holes in overlapping area 294 can fasten the shield portions together. Shield 218, shown fully assembled, provides a barrier between grounded structure 202 and conductor 206. Shield 218 includes overlapping portion 294 which fits between skirts of insulator 212 in a manner similar to the first embodiment.

Figure 3:
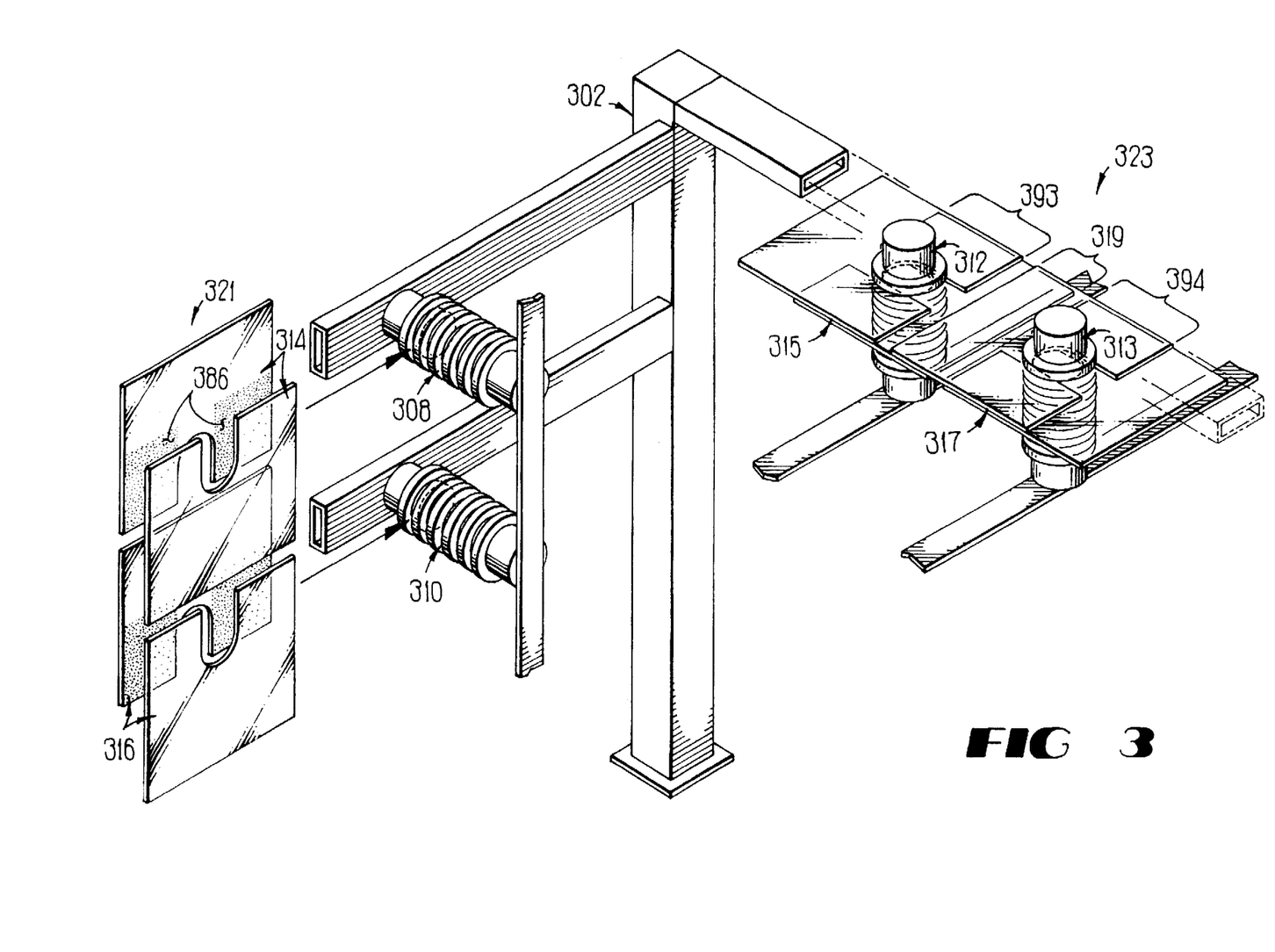
FIG. 3 is a perspective, exploded view of a third embodiment of a shield according to the present invention.

FIG. 3 represents a third embodiment of the present invention. In this particular embodiment, two or more insulators may be located close to each other on grounded structure 302. Shields 314 and 316 are mounted vertically between skirts of insulators 308 and 310, respectively, to form larger shield 321. In this embodiment, the shield pairs are fastened together using adhesive 386, although any fastening means may be used. A distance between insulators 308 and 310 is less than one half the width of shields 314 and 316. Similar shields 315 and 317 are mounted horizontally on insulators 312 and 313, fastened at overlapping portions 393 and 394, respectively, and form a larger shield 323. A distance between insulators 312 and 313 is less than one half the width of shields 315 and 317. Due to the close proximity of insulators in each pair, shield portions from separate shield assemblies form an overlap portion 319. According to this embodiment, a continuous shield may be created between any number of closely spaced insulators. Furthermore, overlapping portions may be created on any peripheral edge of a particular shield; such an arrangement creates a continuous barrier across a group of insulators which are not necessarily collinear. Furthermore, peripheral edges from separate shields which form overlapping portions 319 may also be fastened together, if needed, by any appropriate fastening means such as adhesive 386.

Figure 4:
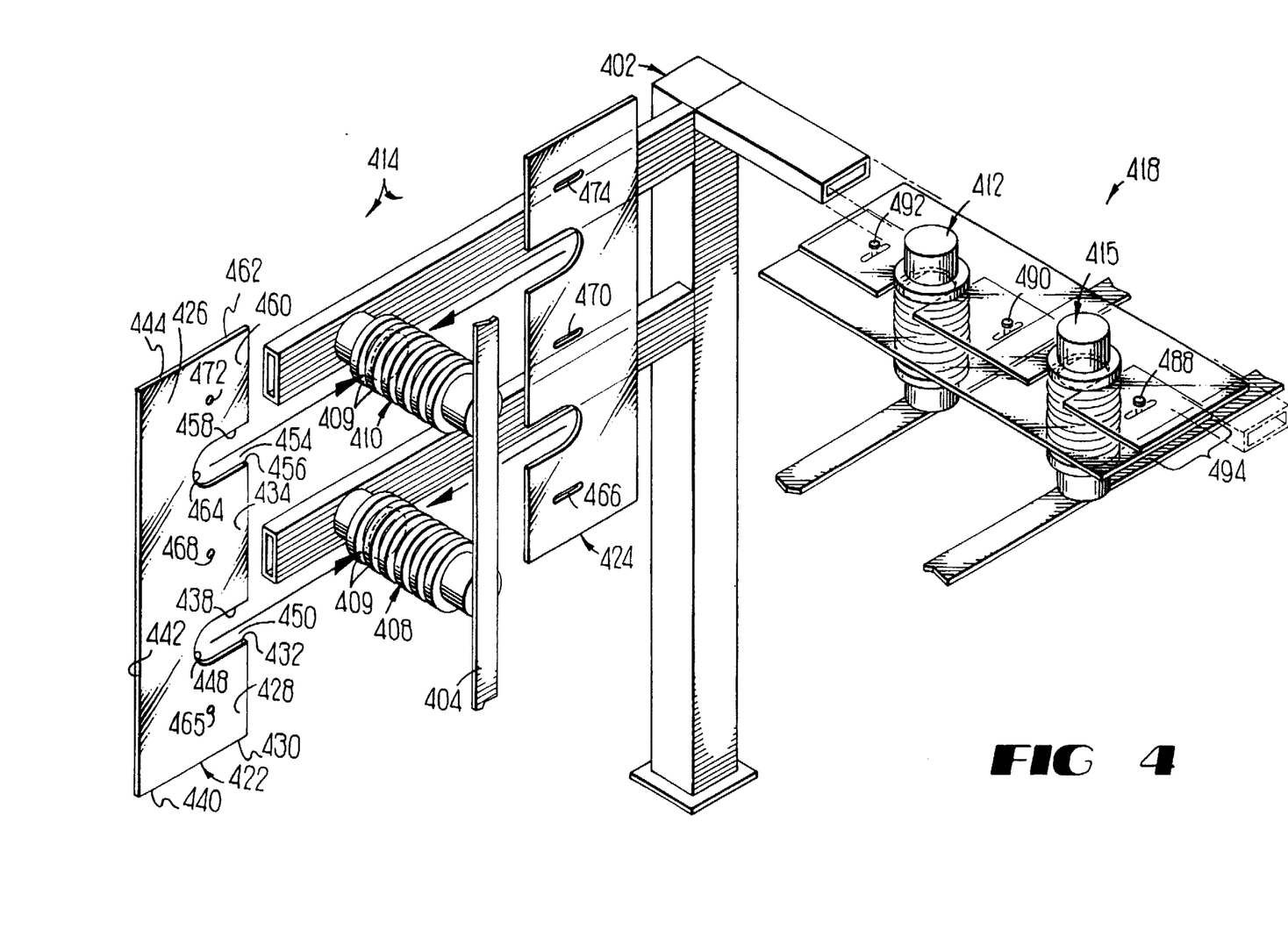
FIG. 4 is a perspective, exploded view of a fourth embodiment of a shield according to the present invention.

FIG. 4 illustrates a fourth embodiment of the present invention in which single shields 414 and 418 are adapted to fit onto any number of insulators which are close to one another on grounded structure 402. FIG. 4 illustrates two pairs of insulators; insulators 408 and 410 support conductor 404, and insulators 412 and 415 support separate conductors. This embodiment can include adaptations to accommodate any number of closely placed insulators by varying the number of slits in each portion. Shield 414 is rectangular in shape after assembly. Shield portions 422 and 424 are similar in shape. Shield portion 422 includes main portion 426 which is rectangular in shape and bordered by peripheral edges 440, 442, and 444. FIG. 4 illustrates horizontally mounted insulators 408 and 410 located in a vicinity of each other, therefore three extensions 428, 434 and 460 extend from main portion 426. Extension 428 is bordered longitudinally by outer and inner edges 430 and 432, respectively. Extension 434 is bordered by inner edges 438 and 456. Extension 460 is bordered by inner edge 458 and outer edge 462. Inner edges 432 and 438 and central edge 448 define slit 450 which is adapted to fit over insulator 408 between skirts 409 in a manner identical to the first embodiment illustrated in FIG. 1. Similarly, inner edges 456 and 458 and central edge 464 define slit 454 which is adapted to fit over insulator 410 between skirts 409. FIG. 4 also illustrates hole 465 and matching slot 466, hole 468 and matching slot 470 as well as hole 472 and matching slot 474 as fastening means between shield portions 422 and 424 at overlapping portion 494. Shield 418, shown mounted on vertical insulators 412 and 415 is secured by fasteners 488, 490, and 492 in hole-slot pairs on overlapping portion 494. Any appropriate fastening means may be used including screws, bolts and nuts, or pop rivets. Also, adhesive may be used to fasten shield portions together.

The embodiments disclosed in FIGS. 1 to 4 illustrate each portion of a single shield to be substantially symmetrical. However, it should be noted that a single shield does not necessarily have to made from symmetrical portions. For example, a first shield portion may have longer extensions and deeper slits while a corresponding second shield portion may not have any slits. Furthermore, this shield may be rectangular, square, circular, or any other desired shape. Furthermore, any known means may fasten the portions around one or more insulators, thus the shield portions may or may not have hole-slot pairs on overlapping portions.

Figure 5:
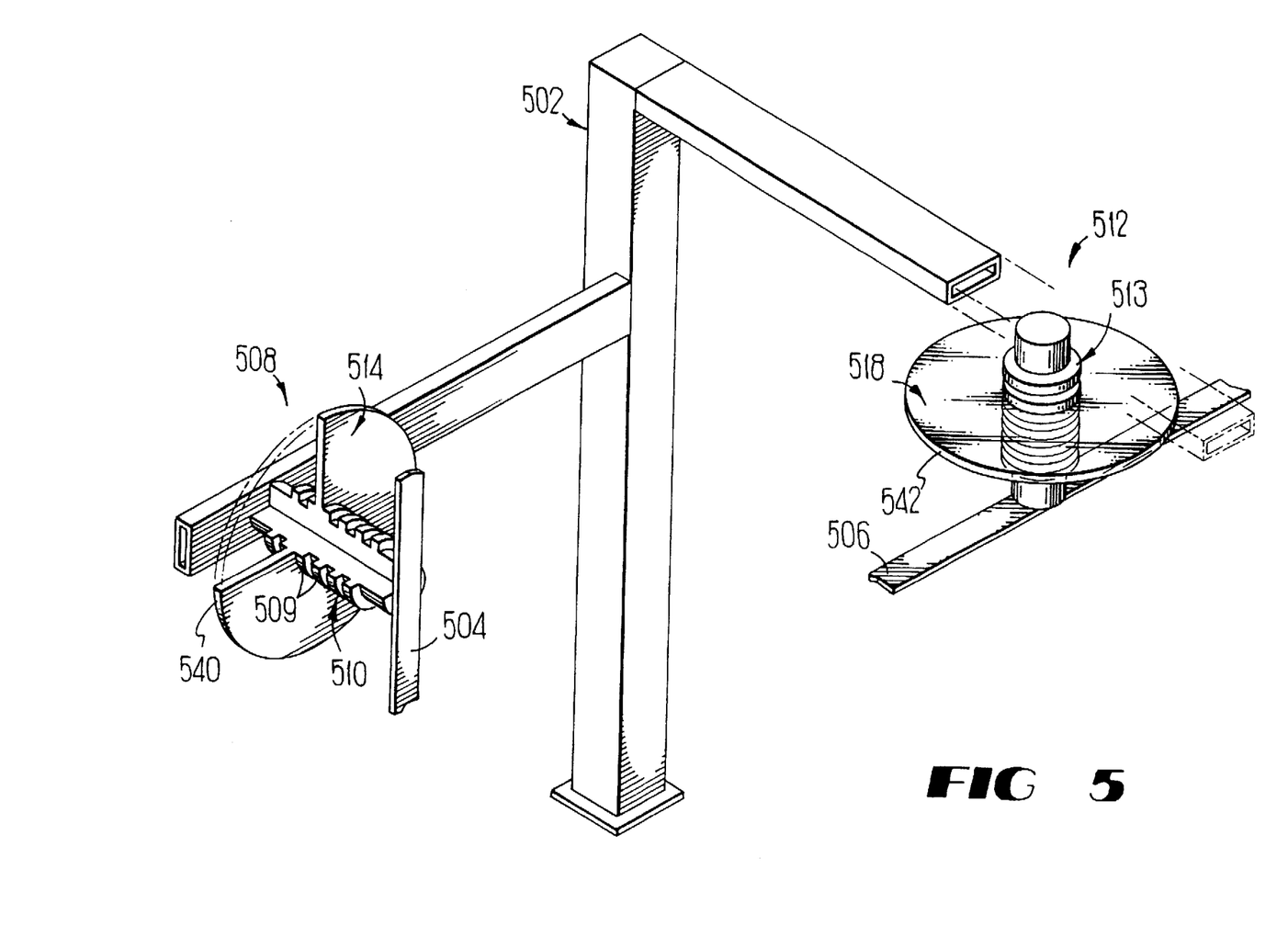
FIG. 5 is a perspective and partial cut-away view of a fifth embodiment of a shield according to the present invention.

FIG. 5 illustrates a fifth embodiment of the present invention. In this embodiment, an electrical insulator and a nonconducting shield are integrated into a unitary construction. Shielded insulators 508 and 512 have main bodies 510 and 513, respectively. Each of the main bodies 510 and 513 has a first end mounted on grounded structure 502 and a second end mounted on energized conductors 504 and 506, respectively. Between the first and second ends, shields 514 and 518 extend from the main bodies 510 and 513, respectively. Additionally, shielded insulators 508 and 512 also have radially extending skirts 509 extending from main bodies 510 and 513. Although shields 514 and 518 in FIG. 5 are circular, the radially extending shields 514 and 518 may have any shape. For example, shields 514 and 518 may be square, rectangular, octagonal, oval, or any other shape best suited for the particular environment in which the shielded insulators are used. Shields 514 and 518 are bordered by peripheral edges 540 and 542, respectively.

Figure 6:
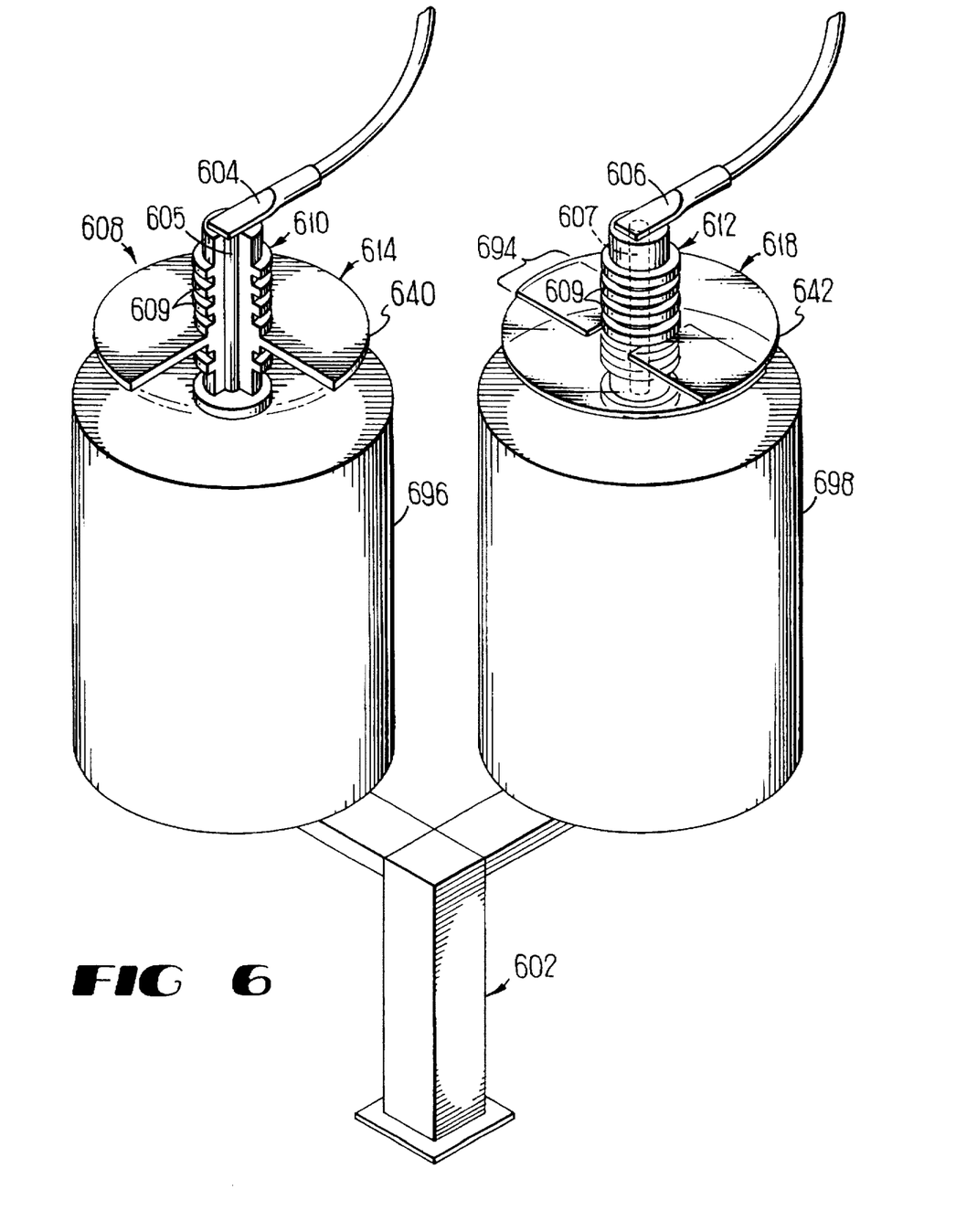
FIG. 6 is a perspective and partial cut-away view of a sixth embodiment of a shield according to the present invention.

FIG. 6 illustrates a sixth embodiment of the present invention. In this embodiment, a shield 614 is provided on a bushing between a conductor 604 and a grounded housing 696 of a breaker or transformer. A bushing differs from an insulator in that a bushing has a conductive core. Generally, a bushing is used to feed a cable lead into some device. For example bushing 608, provides an electrical connection 605 between a conductor 604 and a transformer or breaker (not shown) within housing 696, and insulates cable leads from a grounded housing 696 of the breaker or transformer. In this particular embodiment, a nonconducting bushing having a main body 610 and nonconducting shield 614 form an integrated, shielded bushing 608 having a unitary construction. The main body 610 has a first end mounted on grounded housing 696. The conductor 604 is mounted on a second end of main body 610. Between the first and second ends, shield 614 extends from the main body 610. Additionally, shielded bushing 608 has radially extending skirts 609 extending from main body 610. Although shield 614 in FIG. 6 is circular, it may be of any shape. For example, shield 614 may be square, rectangular, octagonal, oval, or any other shape best suited for the particular environment in which the shielded bushing is used.

Also as shown in FIG. 6, a shield of two portions may also be mounted onto a standard bushing 612. Bushing 612 has a first end mounted on grounded housing 698. A conductor 606 is mounted a second end of bushing 612. Conductor 606 is electrically connected to a breaker or transformer (not shown) within housing 698 via connector 607. Shield 618 includes two portions which are adapted to fit around bushing 612 between skirts 609. Overlapping portion 694 provides adequate space to fasten the two portions together by any known means.

Although shielded insulators 508 and 512 and shielded breaker 608 can be constructed from any durable, nonconducting material, they are preferably fabricated from a strong, moisture resistant polymer. The polymer must also be capable of resisting degradation from ultraviolet radiation associated with sunlight. Additionally, the polymer must withstand high temperatures for short durations should occasional arcing between the conductor and grounded structure occur. Also, the shielded insulator may be fabricated from a fiber reinforced polymer composite for added strength. Moreover, a polymer which exhibits compliance near the peripheral edges 540, 542, and 640 is desirable since shield overlapping may occur when several shielded insulators are mounted close to one another. Additionally, the polymer which forms the shield, shielded bushing, or shielded insulator may comprise a thermoplastic or thermosetting resin. Furthermore, shielded insulators and shielded bushings can be manufactured having several possible axial locations for the shield. Shielded insulators and shielded bushings having dissimilar axial shield locations can be mounted close to one another to eliminate physical shield interference. As illustrated by FIG. 5, the shielded insulators 508 and 512 may be opaque or transparent. Finally, shielded bushing 608 may also be transparent or opaque.

The shield embodiments illustrated in FIGS. 1 through 4 are adapted to be placed on existing switch and bus insulators since switch and bus insulators are primary points of contact when small animals climb on power distribution substations. These embodiments therefore provide for a barrier on existing switch and bus insulators and prevent animals from simultaneously contacting a grounded structure and an energized conductor, thus eliminating a ground path from the energized conductor through the animal to the grounded structure. The shielded insulators disclosed in FIG. 5 replace existing insulators in a substation, can be used in the construction of a new substation, and also prevent a small animal from simultaneously contacting a grounded structure and a conductor. Similarly, shielded bushing 608 disclosed in FIG. 6 replaces existing bushings in a substation and may be used in the construction of a new substation.

When a small animal such as a squirrel traverses grounded structure 102 of FIG. 1 and approaches insulator 108, the squirrel must also traverse the shield 114 to come into contact with conductor 104. The distance between the peripheral edge 140 of shield 114 and a peripheral edge of the skirt 109 is sufficient to force the squirrel to break contact with the grounded structure to move from the shield 114 to the conductor 104. In other words, the shield prevents the squirrel from making contact with the grounded structure and a conductor simultaneously. Since the shields are constructed of nonconducting material fastened to a porcelain insulator, no path to ground is provided whenever the squirrel is in contact with either the grounded structure and shield or the shield and conductor. If the squirrel attempts to reverse its path, the squirrel must break contact with the conductor to traverse from the shield to the grounded structure. Additionally, square shield 214 illustrated in FIG. 2 is of sufficient width so as to prevent the squirrel from contacting both the conductor 204 and the grounded structure 202 simultaneously. Also, the embodiment illustrated in FIG. 3 provides an even wider barrier for a squirrel or small animal to traverse since peripheral edges of adjacent shields overlap at portions 319. For example, the overlapping arrangement of adjacent shields embodied in FIG. 3 is very useful for providing a barrier between the grounded supporting structure and a disconnect switch mounted on two insulators. Moreover, the embodiment illustrated in FIG. 4 also provides for a widened barrier across multiple insulators using only two portions 422 and 424. In the embodiment illustrated in FIG. 5, shields 514 and 518 provide a barrier between grounded structure 502 and conductors 504 and 506. Similarly, edges 640 and 642 of the embodiment disclosed in FIG. 6 also are of adequate distance from skirts 609 to present a small animal from simultaneously contacting the grounded housing and the conductor. Finally, in all embodiments, any peripheral edge of a shield is a sufficient distance from any peripheral edge of an insulator or bushing skirt to prevent an animal from simultaneously contacting a grounded structure and a conductor.

It should be apparent to those skilled in the art that the shield disclosed in each embodiment of the present invention may have any shape. With regard to the embodiments illustrated in FIGS. 1 through 4 and 6, any fastening means can be utilized to attach each portion of each shield around an insulator or bushing. Furthermore, any number of slits may be provided in each portion of a shield regardless of overall shield shape. Moreover, each embodiment may be transparent, opaque or translucent. In addition, although the invention has particular applicability to power distribution substations, its principles could be embodied in other devices which contain exposed, electrically energized surfaces in close proximity to grounded, conductive structures. It should also should be understood that various changes to the present invention may be made by the ordinarily skilled artisan, without departing from the spirit and scope of the present invention which is set forth in the claims below. The ordinarily skilled artisan will understand that this disclosure represents an example of the invention and is not meant to limit the invention, as presented in the claims, in any way whatsoever.

What is claimed is:

1. For use in an electrical power distribution substation including a grounded structure, and an energized conductor, an apparatus for preventing a small animal having a defined length approximately equal to that of an average-sized squirrel from simultaneously contacting the grounded supporting structure and the energized conductor comprising:

an electrically non-conducting main body including,
a first end coupled to the grounded structure,
a second end coupled to the conductor,
a medial portion including a main body peripheral edge portion disposed between said first portion and second ends;

a first shield element constructed of nonconducting material and including front and back planar surfaces;

a second shield element constructed of nonconducting material and including front and back planar surfaces;

means for fastening said first shield element to said second shield element to form a shield assembly around said main body without requiring disassembly of said main body from said grounded structure or said energized conductor, wherein the front surface of the first shield element partially overlaps the back surface of said second shield element to form said shield assembly, and wherein said shield assembly extends radially outward from said main body;

said means for fastening selected from the group consisting of elongated slots on said first shield element and corresponding holes on said second shield element, pop rivets, adhesive applied to each said shield element; and said shield assembly having a peripheral shield edge portion bordering said front and back planar surfaces of said first and second shield elements, wherein said peripheral shield edge portion is sufficiently distant from said main body peripheral edge portion, such that a sum of a first distance from said main body first end to said peripheral shield edge and a second distance from said peripheral shield edge to said main body second end is greater than the defined length of the small animal, thereby preventing the small animal from simultaneously contacting the grounded structure and the conductor.

2. The apparatus of claim 1 wherein said main body further comprises:

at least one skirt extending radially from said main body between said first and second ends, wherein an outer peripheral edge of each said skirt includes said main body peripheral edge portion.

3. The apparatus of claim 2 wherein said main body, said at least one skirt and said shield assembly form a shielded insulator.

4. The apparatus of claim 2 wherein said main body, said at least one skirt, and said shield assembly form a shielded bushing.

5. The apparatus of claim 1 wherein said first and second shield elements are constructed of substantially transparent material.

6. The apparatus of claim 1 wherein said first and second shield elements are constructed of a thermoplastic polymer.

7. The apparatus of claim 1 wherein said first and second shield elements are constructed from a thermosetting resin.

8. The apparatus of claim 1 wherein said main body is an insulator containing skirts, each of said skirts having a peripheral edge portion which includes said main body peripheral edge portion, and wherein at least one of said shield elements comprises:

a slot adapted to matingly engage said insulator including a central edge portion conforming to an outside surface of said insulator between skirts.

9. The apparatus of claim 8 wherein each said shield element is U-shaped and said central edge portion and said peripheral shield edge portion are substantially semi-circular and concentric.

10. The shield assembly of claim 8 wherein each said shield element is substantially rectangular and said central edge is semicircular.

11. For use in an electrical power distribution substation including a first conductor, a second conductor, and an intermediary device having a first end connected to the first conductor, a second end connected to the second conductor, and a medial portion including a main body peripheral edge portion, wherein the intermediary device insulates the first conductor from the second conductor, a shield assembly for a preventing small animal having a defined length approximately equal to that of an average-sized squirrel from simultaneously contacting the first and second conductors, said shield assembly comprising:

a first shield element constructed of nonconducting material and including front and back planar surfaces;

a second shield element constructed of nonconducting material and including front and back planar surfaces;

means for fastening said first shield element to said second shield element to form a shield assembly around the intermediary device without requiring disassembly of the intermediary device from the first or second conductors, wherein one front surface of said first shield element partially overlaps one back surface of said second shield element to form said shield assembly, and wherein said shield assembly extends radially outward from the intermediary device;

said fastening means selected from the group consisting of elongated slots on said first shield element and corresponding holes on said second shield element, pop rivets, and adhesive applied to each of such shield element; and said shield assembly having a peripheral shield edge portion bordering said front and back planar surfaces of said first and second shield elements, wherein said peripheral shield edge portion is sufficiently distant from a peripheral edge portion of the intermediary device such that a sum of a first distance from the first end of the intermediary device to said peripheral shield edge portion and a second distance from said peripheral shield edge portion to the second end of the intermediary device is greater than the defined length of the small animal, thereby preventing the small animal from simultaneously contacting the first and second conductors.

12. The shield assembly of claim 11 wherein the intermediary device is an insulator containing skirts, each of the skirts having a peripheral edge which includes the intermediary device peripheral edge portion and wherein at least one of said shield elements comprises:

a slot adapted to matingly engage the insulator including a central edge conforming to an outside surface of the insulator between skirts.

13. The shield assembly of claim 11 wherein the intermediary device is a bushing containing skirts, each skirt having a peripheral edge which includes the intermediary device peripheral edge portion and wherein at least one of said shield elements comprises:

a slot adapted to matingly engage the bushing including, a central edge conforming to an outside surface of the bushing between skirts.

14. The shield assembly of claim 11 wherein each said shield element is U-shaped and said central edge and said peripheral shield edge portion are substantially semi-circular and concentric.

15. The shield assembly of claim 11 wherein each said shield element is substantially rectangular and said central edge is semicircular.

16. The shield assembly of claim 11 wherein said each said shield element is constructed of substantially transparent material.

17. The shield assembly of claim 11 wherein each said shield element is constructed from a transparent polycarbonate polymer.

18. For use in an electrical power distribution substation including a grounded supporting structure, an energized conductor, and a plurality of insulators, each having a peripheral edge portion, wherein the insulators connect the conductor to the grounded supporting structure, a shield assembly for preventing a small animal having a defined length approximately equal to that of an average-sized squirrel from simultaneously contacting the grounded supporting structure and the energized conductor comprising:

a first shield element constructed of nonconducting material and including front and back planar surfaces;

a second shield element constructed of nonconducting material and including front and back planar surfaces, wherein at least one of said shield elements is adapted to fit around at least two insulators;

means for fastening said first shield element to said second shield element around the insulators without requiring disassembly of the grounded structure or the conductor from the insulators, wherein said front surface of said first shield element partially overlaps said back surface of said second shield element to form said shield assembly, wherein said shield assembly extends radially outward from the insulators;

said shield assembly having a peripheral shield edge portion bordering said front and back planar surfaces of said first and second shield elements, wherein said peripheral shield edge portion is sufficiently distant from the insulator peripheral edge portion such that a sum of a first distance from the first end of the insulator to said peripheral shield edge portion and a second distance from said peripheral shield edge portion to the second end of the insulator is greater than the defined length of the small animal, thereby preventing the small animal from simultaneously contacting the grounded structure and the conductor; and wherein at least one of said shield elements is adapted to fit around at least two insulators.

19. The shield assembly of claim 18 wherein the insulators contain skirts each having a peripheral edge portion which includes the insulator peripheral edge portion and wherein at least one of said shield elements comprises:

slots adapted to matingly engage the insulators including central edges conforming to outside surfaces of the insulators between skirts.

20. The shield assembly of claim 19 wherein at least one of said shield elements is substantially rectangular in shape and further includes substantially semi-circular central edges.

21. The shield assembly of claim 19 wherein said shield elements are constructed of substantially transparent material.

22. The shield assembly of claim 19 wherein each said shield element is fabricated from a transparent polycarbonate material.

23. The shield assembly of claim 19 wherein said fastening means includes elongated slots on said first shield element and corresponding holes on said second shield element.

24. The shield assembly of claim 23 wherein said fastening means includes pop rivets.

25. The shield assembly of claim 19 wherein said fastening means includes adhesive applied to the portions of the shield.

\* \* \* \* \*